Feb. 5, 1963 E. J. CLAASSEN, JR., ETAL 3,076,695
PROCESS AND APPARATUS FOR THE PRODUCTION OF CARBON BLACK
Filed June 22, 1961 4 Sheets-Sheet 1

Inventors:
Edwin J. Claassen, Jr.
James W. Bulls
By *Munn & Love*
Atty.

Feb. 5, 1963 E. J. CLAASSEN, JR., ETAL 3,076,695
PROCESS AND APPARATUS FOR THE PRODUCTION OF CARBON BLACK
Filed June 22, 1961 4 Sheets-Sheet 2
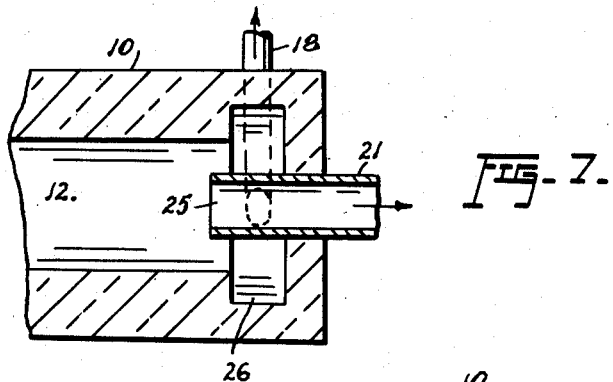
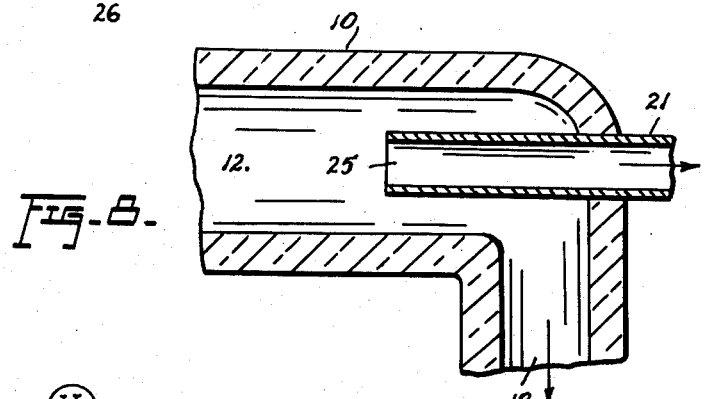
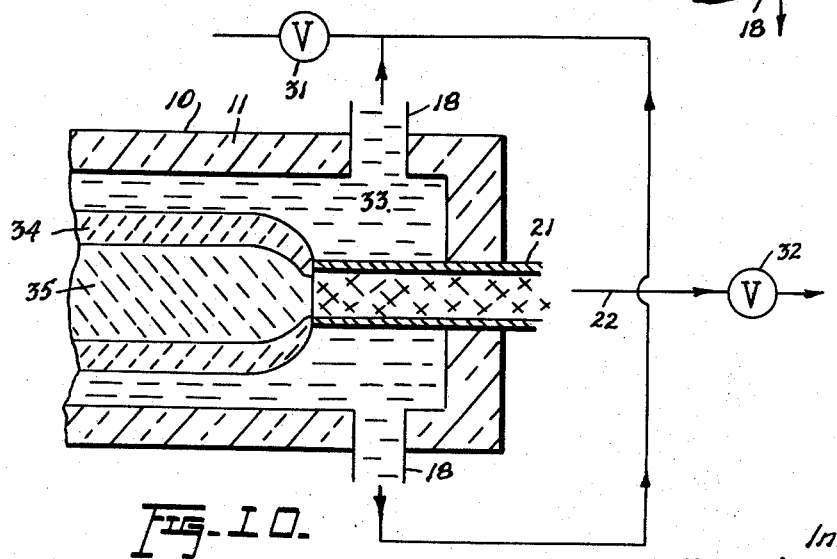
Inventors:
Edwin J. Claassen, Jr.
James W. Bulls
By
Atty.

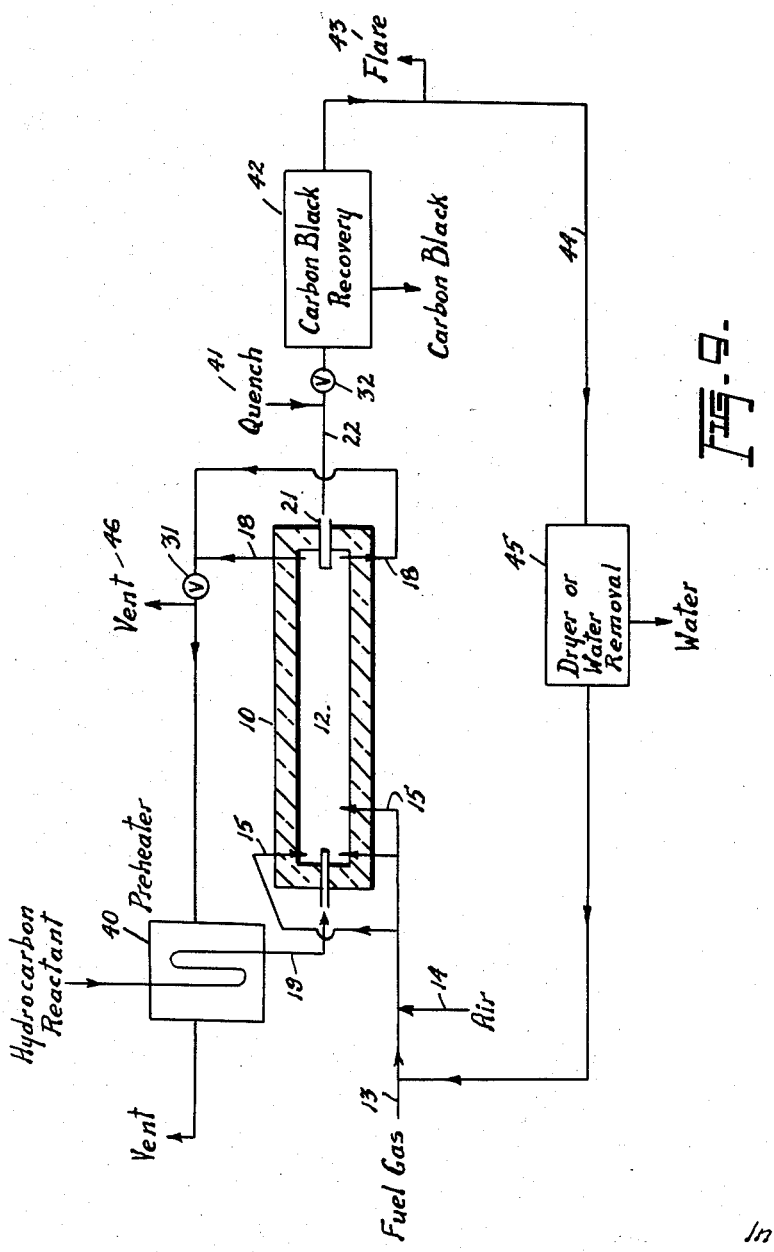

Feb. 5, 1963 E. J. CLAASSEN, JR., ETAL 3,076,695
PROCESS AND APPARATUS FOR THE PRODUCTION OF CARBON BLACK
Filed June 22, 1961 4 Sheets-Sheet 4

INVENTORS
Edwin J. Claassen, Jr.
James W. Bulls
James K. Normand
BY Mumm Whare.
ATTORNEY

United States Patent Office 3,076,695
Patented Feb. 5, 1963

3,076,695
PROCESS AND APPARATUS FOR THE PRODUCTION OF CARBON BLACK
Edwin J. Claassen, Jr., Odessa, James W. Bulls, El Paso, and James K. Normand, Big Spring, Tex., assignors to Sid Richardson Carbon Co., Fort Worth, Tex., a corporation of Texas
Filed June 22, 1961, Ser. No. 118,889
14 Claims. (Cl. 23—209.4)

This invention relates to processes and apparatus for the production of carbon black from either gaseous or liquid hydrocarbons.

More specifically, our invention relates to a process for producing carbon black in a reaction chamber having a peripheral wall of generally circular cross section and end walls, which process comprises continuously introducing a reactant hydrocarbon stream of fluid at approximately the center of one of the end walls, passing said reactant stream axially from the inlet to the outlet end of the reaction chamber without contacting the peripheral wall, heating the reactant stream while passing through the reaction zone of said chamber to a temperature sufficient to decompose the hydrocarbon and form carbon black by heat interchange with a heat donating stream of fluid, and thereafter removing a portion of the reactant stream containing the major portion of carbon black from the reaction chamber through an opening in the center of the outlet end wall, said heating being accomplished by forcing the heat donating stream of fluid tangentially through the peripheral wall into the reaction chamber near one end thereof, and maintaining it at a sufficiently high velocity so that the heat donating stream forms a vortex which blankets the cylindrical wall of the reaction chamber throughout substantially the entire length thereof while leaving a central portion substantially open for passage of the reactant stream axially therethrough from end to end of the chamber, maintaining the reactant and the heat donating streams in direct heat exchange relation throughout their passage through the reaction zone of the chamber, removing a portion of the heat donating stream of fluid from the periphery of the chamber through at least one peripheral port adjacent the end of the reaction chamber opposite from its inlet, cooling the portion of the carbon containing stream removed from the central outlet in the reaction chamber, and separately collecting the carbon black therefrom.

From the apparatus standpoint our invention relates to a furnace for heat reacting hydrocarbon fluids to effect thermal decomposition thereof, said furnace comprising a peripheral side wall portion of circular cross section having end walls defining with the side wall a reaction chamber, means for passing the heat donating fluid from end to end of the reaction chamber in a swirling movement wherein the heat donating fluid forms a vortex blanketing substantially the entire peripheral surface of the reaction chamber, and for peripherally withdrawing the heat donating fluid from the end of the chamber opposite its entry, said means comprising at least one inlet port extending through the circular wall tangentially into the reaction chamber, and at least one oppositely disposed withdrawal port so arranged as to receive the swirling heat donating fluid without change in direction of the heat donating fluid, tangentially located in the peripheral wall adjacent the opposite end of the reaction chamber from the inlet port, means for establishing a pressure differential between the peripheral inlet and outlet ports to insure passage of the heat donating fluid therethrough and means for passing a hydrocarbon containing stream of reaction fluid axially through the center of the furnace, including an axial inlet opening for the reactant fluid located at the approximate center of one end wall, and an outlet port located in substantial axial alignment therewith in the opposite end wall, said axial inlet opening being connected to an external source of supply of hydrocarbon fluid and said axial outlet being connected to external means for separating decomposition products from the outgoing stream, the entire interior of the furnace being open from end to end to permit direct contact between the heat donating stream of the fluid and the reaction fluid to effect heat interchange therebetween, and to thermally decompose the hydrocarbon constituents of the reactant stream of fluid.

In its broadest aspects the heat donating fluid may either be preformed by admixing air or other oxygen containing gas with combustible gas or vapor externally of the furnace and introducing the same through tangential inlets or burners into the furnace, or if preferred air or other oxygen containing gas may be introduced tangentially into the furnace and used to burn a portion of a suitable hydrocarbon gas, vapor or other combustible material within the furnace, to produce the necessary heat for the production of carbon black from the reactant hydrocarbon stream passing axially through the furnace.

If desired a number of side ports or burners may be provided at intervals longitudinally of the furnace in addition to the end tangential ports, through which the heat donating fluid or an oxygen containing component thereof may be introduced tangentially into the furnace.

Also, while it is an important feature of the invention that the stream of heat donating fluid be passed tangentially through the furnace and the reactant stream of hydrocarbon fluid be passed axially therethrough in direct heat exchange relation, the heat donating and hydrocarbon containing streams of fluid are passed in the same direction with reference to one another through the furnace.

Moreover, while the peripheral wall of the furnace should be of generally circular cross section to facilitate tangential movement of the heat donating fluid, such peripheral wall may be either cylindrical or tapered without departing from the spirit of the invention in its broadest aspects.

The present application is a continuation-in-part of our earlier application Serial No. 826,155, filed July 10, 1959, now abandoned.

Large amounts of carbon black are now being produced in suitable furnaces by the thermal decomposition of hydrocarbons. Such carbon black is generally known as furnace carbon black. Many processes and types of furnaces have been used in the past, or are in use at the present time, for producing furnace carbon black. Illustrative of these processes and furnaces are Patent 2,144,971 to Heller et al., Patent 2,368,828 to Hanson et al., Patent 1,807,321 to Miller, Patent 2,378,055 to Wiegand, Patent 2,419,565 to Krejci, and Patent 2,625,466 to Williams. Heller et al. introduce thin alternate layers of air and gas which burn with a non-turbulent flame. Combustion occurs at the interface, giving sufficient heat to decompose the hydrocarbon within the thin layer of gas. Downstream in the furnaces all of the gases, both from the combustion and the decomposition reactions, mix thoroughly and exit from the furnace as a single gas stream. Hanson et al. introduce hydrocarbon axially into a cylindrical furnace and introduce air, or air and gas, tangentially into the furnace. Heat is supplied to the hydrocarbon in a first section of the furnace by the hot gases in tangential motion around the periphery of the furnace, but the two gas streams are thoroughly mixed by a constricted portion in a second section of the furnace. Miller introduces hydrocarbon axially into a cylindrical furnace and introduces air in the same direction as a ring surrounding the hydrocarbon. Again, the two streams mix thoroughly within the furnace. Wiegand produces hot combustion gases at one end of an elongated furnace and injects streams of hydrocarbon approximately at right angles into the hot combustion gases as they pass through the furnace, giving fairly rapid mixing of the hydrocarbon and the hot combustion gases. Krejci introduces the hydrocarbon axially into a cylindrical furnace and burns a mixture of air and hydrocarbon so as to produce a swirling tangential flame around the wall of the furnace. The hydrocarbon and the hot combustion gases are then mixed to decompose the hydrocarbon into carbon black. Williams also introduces the hydrocarbon axially into a cylindrical furnace and burns a mixture of air and hydrocarbon, which has been introduced in a direction parallel to the hydrocarbon, in a ring surrounding the hydrocarbon. The stream of hydrocarbon and combustion gases is then thoroughly mixed to produce carbon black.

It is known that many chemical reactions tend to take place within a carbon black producing furnace which reduce the amount of heat liberated and/or reduce the yield of carbon black. Some of these are:

(1) The reaction of oxygen with hydrocarbon to form carbon monoxide instead of carbon dioxide. The formation of carbon dioxide liberates approximately three times as much heat as the formation of carbon monoxide with the same consumption of hydrocarbon.

(2) The reaction of water vapor with hydrocarbon or carbon to form carbon monoxide and hydrogen. This is an endothermic reaction which consumes both heat and hydrocarbon.

(3) The dilution of the reactant hydrocarbon with non-reactant gases. The higher the dilution, the slower is the rate of reaction of hydrocarbon to carbon black—as shown both by experience and by the chemical law of mass action.

We have found that the heat-donating stream of gases within the furnace can largely be kept separated from the carbon black-producing stream of gases within the furnace. The two streams are introduced separately into the same furnace, pass through the furnace in physical contact, and are removed from the furnace in two separate streams. A portion of the heat-donating stream passes into the carbon black-producing stream, but a high percentage of the stream is peripherally removed from the furnace carrying no carbon black or only a small amount of carbon black. This method of operation tends to minimize all of the above undesirable reactions which reduce the efficiency of a carbon black furnace.

It is an object of the present invention to provide an improved process and apparatus for producing furnace carbon black. Another object is to provide a furnace for producing carbon black which will minimize mixing of the heat-donating stream of gases with the carbon black-producing stream of gases. Still another object is to increase the yield of carbon black of a specific quality which can be produced from a specific hydrocarbon. Still other objects and advantages will be apparent to those skilled in the art from a study of the following description, drawings, examples and claims.

These objects may be accomplished in accordance with our invention which comprises the formation of a swirling stream of combustion gases by firing air or a mixture of fuel gas and air into a cylindrical reaction chamber from one or more burner ports that are essentially tangent to the interior wall and approximately perpendicular to the longitudinal axis of the chamber, the velocity of these gases being so great that these gases adhere to the side walls of the reaction chamber due to their centrifugal force, introducing hydrocarbon reactant into the end of the furnace in a direction superimposed upon the longitudinal axis of the furnace and parallel to the linear component of the swirling stream of combustion gases, removing a substantial portion, preferably from about 20% to 70% of the combustion gases, through a peripheral port or ports at the outlet end of the furnace, and removing the remainder of the combustion gas plus essentially all of the carbon black-producing stream through an axial port in the end of the furnace opposite the inlet end, which latter port is parallel to and superimposed upon the longitudinal axis of the furnace.

Our process and apparatus will be more readily understood by reference to the accompanying drawings which show representative forms of the apparatus, in which:

FIG. 4 and FIG. 6 are modifications of the inlet end of the furnace, while FIG. 5, FIG. 7 and FIG. 8 are modifications of the outlet end of the furnace;

FIG. 9 is a diagrammatic representation of a typical flowsheet of the process, together with the major items of auxiliary equipment required to make the process continuously operable;

FIG. 10 is a representation of the gas flow pattern at the outlet end of the furnace;

Figure 1:
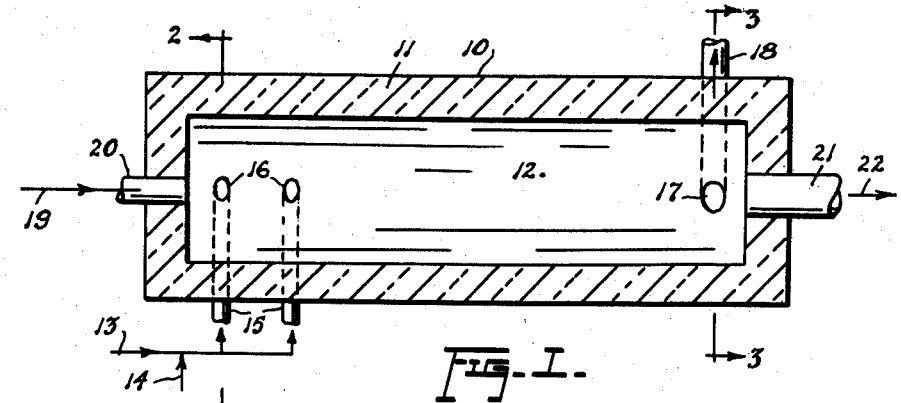
FIG. 1 is a diagrammatic representation, partly in elevation and partly in section, of one form of the apparatus, the section portion being taken on the line 1—1 of FIG. 2.
Figure 2:
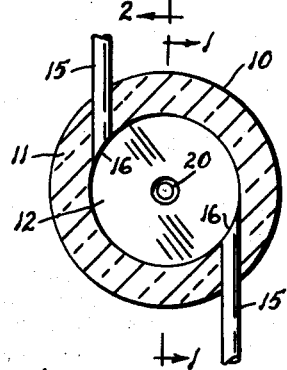
FIG. 2 is a section taken on the line 2—2 of FIG. 1.
Figure 3:
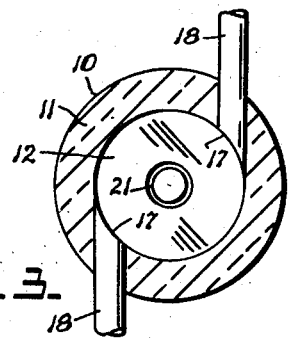
FIG. 3 is a section taken on the line 3—3 of FIG. 1.

Referring first to FIGS. 1 through 3, the furnace 10 has a body constructed of heat-resisting ceramic material 11 to form a cylindrical reaction chamber 12. Fuel gas in line 13 is mixed with air from line 14 and introduced into the chamber 12 through one or more burners 15 and burner ports 16 at sufficient velocity to cause the flame to adhere to the inside surface of the chamber and to form a layer of flame and products of combustion over this inner surface throughout the entire length of the chamber 12. The burners 15 are tangential to the surface of the reaction chamber 12 and are essentially perpendicular to the longitudinal axis of the furnace. Due to the centrifugal force upon entering the said reaction chamber, the stream of flame and combustion products form a cylindrical layer on the inside wall of the reaction chamber and revolve in a swirl toward the outlet end of the chamber. This cylindrical layer separates the central core of reactant gas and the chamber wall so that the reaction to carbon black takes place out of contact with solid surfaces. The layer of combustion products, or a portion of it, is taken from the reaction chamber 12 through peripheral outlet ports 17 and lines 18.

The hydrocarbon reactant stream 19 enters the furnace through inlet 20 and passes down the longitudinal axis of the furnace through the center of the swirling layer of combustion gases. The hydrocarbon material is largely decomposed into carbon black as it passes through the furnace. The stream of material containing the decomposition products of the hydrocarbon reactant (principally carbon black), plus a portion of the combustion gases, leave the furnace through an axial outlet 21 as stream 22.

Figure 4:
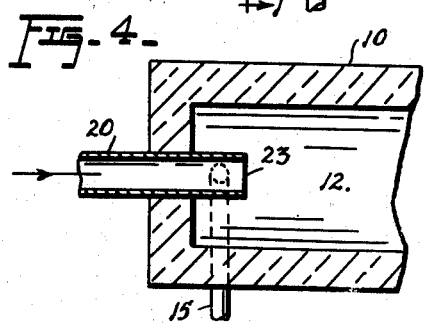
Figure 6:
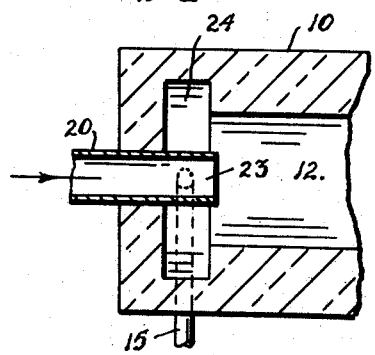

FIGS. 4 and 6 show modifications of the inlet end of the furnace. An extension 23 can be made to reactant inlet tube 20 so that the reactant is released within the furnace a greater distance downstream. In some cases, the extension 23 helps to keep the reactant stream separated from the layer of combustion gases. The diameter of reaction chamber 12 can be increased as shown by 24 in FIG. 6. In some cases, the greater diameter helps to keep the reactant stream separated from the layer of combustion gases.

Figure 5:
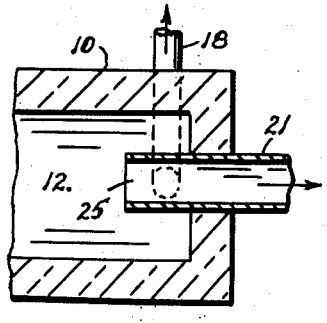

FIGS. 5, 7 and 8 show modifications of the outlet end of the furnace. An extension 25 can be made to outlet tube 21 so that the carbon black-forming stream can be brought into the outlet tube a greater distance upstream. In some cases, the extension 25 helps to keep the carbon black-forming stream separated from the layer of combustion gases. The diameter of the reaction chamber 12 can be increased as shown by 26 in FIG. 7. In some cases, the greater diameter helps to keep the carbon black-forming stream separated from the layer of combustion gases. FIG. 8 shows another modification for removing the heat-donating stream and the carbon black-forming stream from the furnace through separate lines.

FIG. 10 is a representation of the gas flow pattern at the outlet end of the furnace. The swirling layer of combustion gases forms the cylinder 33 which separates the reactant hydrocarbon from the ceramic wall 11. The carbon black-forming stream 35 passes through the center of the swirling cylinder of combustion gases and leaves the furnace through line 21. There is some intermixing of the two streams as they pass through the furnace, as represented by layer 34. Carbon black is generally present in layer 35. To increase the yield of carbon black, the gases of layer 35 are generally removed axially from the furnace through line 21. Regulation of control valves 31 and 32 can split the gases being removed from the furnace in any desired manner from 100% through outlet 18 to 100% through outlet 21.

Since the incoming heat donating gases are admitted to the burners at high velocity, as hereinafter set forth, and since pressure of the spent gases removed from the furnace is valve regulated, it will be apparent that a substantial pressure differential will be established between the peripheral inlet and outlet ports of the furnace. Any suitable means (not shown) may be employed for providing the inlet pressure required to insure such high inlet velocity for the heat donating gases necessary to insure the whirling effect herein described.

FIG. 9 is a schematic representation of some of the major items of equipment which would be used with the carbon black furnace. Hydrocarbon reactant may be passed by option through preheater 40 and then into reaction chamber 12 through line 19. The carbon black-forming stream leaves the furnace through outlet 21 and is cooled by a water quench 41. Carbon black is separated from the gases which are carrying it by conventional means, such as cyclone separators or bag filters, represented by 42. After the carbon black is removed from the stream of gases carried by line 22, the off-gases may be flared at 43, or may be used as fuel for supplying heat to the furnace 10. Line 44 carries the off-gases to a drier 45 for removal of a portion of the water carried by the off-gases, and then takes the off-gases to a point where they are mixed with fuel gas in line 13. The combustion gases are formed inside of the furnace by burning fuel gas from line 13 with air from line 14 in burners 15. The combustion gases pass through the reaction chamber 12, and a large percentage of the combustion gases leave the furnace through peripheral outlets 18. The combustion gases may be vented at 46 or may be used to supply heat at the preheater 40. Regulation of valves 31 and 32 can adjust the relative amount of gases leaving the furnace through outlets 18 and 21.

Figure 11:
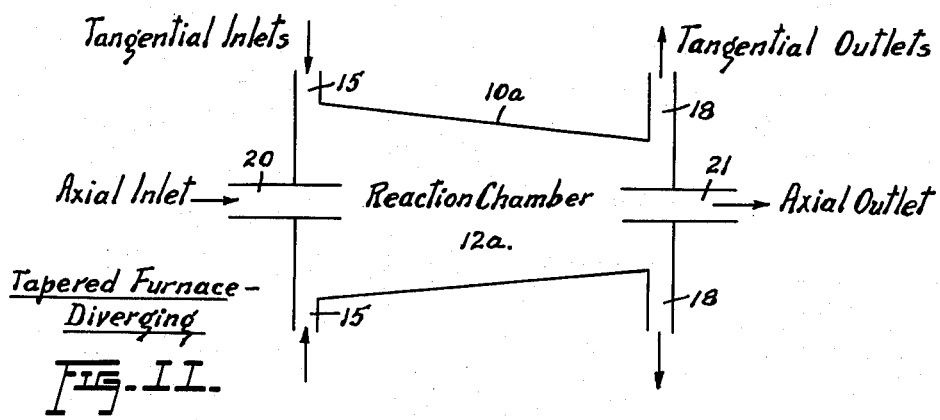
FIG. 11 is a diagrammatic illustration of a furnace with a tapered, converging reaction chamber.
Figure 12:
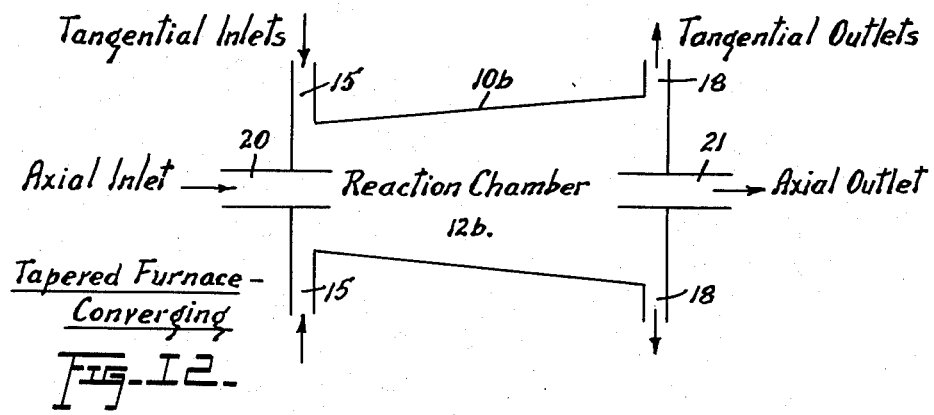
FIG. 12 is a diagrammatic illustration of a furnace with a tapered, diverging reaction chamber.

FIGS. 11 and 12 illustrate various modified arrangements of the furnace and connections of the inlets and outlets thereto. Particularly, FIG. 11 illustrates the furnace 10a having a tapered or frusto-conical reaction chamber 12a, with the hydrocarbon reactant inlet 20 disposed axially at the major end of the chamber, and the outlet 21 for material containing decomposition products of the hydrocarbon reactant with a portion of the combustion gases disposed at the minor end of the chamber. The arrangement of the furnace 10b in FIG. 12 is the same as that of the furnace 10a in FIG. 11, with the exception that the tapered or frusto-conical chamber 12b of the furnace 10b has its minor end at the axial inlet 20 and its major end at the axial outlet 21. In the instance of both the furnace 10a and the furnace 10b, the burners 15 enter the reaction chamber of the furnace tangentially adjacent the axial inlet 20, while the lines 18 for combustion products leave the chamber tangentially adjacent the axial outlet end 21.

This arrangement may also be employed in connection with the tapered furnaces of FIGS. 11 and 12; that is to say, the axial flow of the hydrocarbon reactant stream of fluid may be in a generally reverse direction to the flow of combustion gases or other heat donating stream of fluid.

The method of our invention will now be described in more detail with particular reference to FIGS. 1–10, though reference will also be made to the modifications shown in FIGS. 11 and 12.

The hydrocarbon reactant may be either gaseous or liquid under conditions of normal temperature and pressure. The free energy of formation of the hydrocarbon reactant may be either positive or negative. If liquid reactant is used, it may either be vaporized or sprayed into the furnace as a liquid. The reactant may be preheated or can enter the furnace at ambient temperature. The quality of the carbon black which is produced, and the yield of carbon black from the reactant, varies with each of the foregoing conditions, but the furnace is operable.

The gaseous fuel injected through the burners to form the combustion gases may be any suitable fuel, such as vapors of normally liquid hydrocarbons, but will usually be a normally gaseous hydrocarbon such as natural gas. The oxygen-containing gas for the combustion will usually be air, but it may be a mixture of free oxygen with other gases such as carbon dioxide, carbon monoxide and water vapor, or may be oxygen-enriched air. The amount of air or other oxygen-containing gas injected through the burners will be sufficient to completely burn the gaseous fuel and may be in excess of that required to completely burn all of the gaseous fuel. In the latter case, the excess oxygen will burn a portion of the reactant, or if desired only air or other oxygen containing gas may be supplied through the burners, and used to burn a portion of the hydrocarbon containing reactant fluid.

The fuel gas and the oxygen-containing gas may be premixed before entering the burners if the velocity of the combined stream is high enough to prevent the flame from flashing back into the burners. Or it is possible to mix the two streams at the face of the burners. It is preferred to mix the fuel gas with the oxygen-containing gas upstream of the burners to give smoother and more complete combustion within the burner ports. The flame or combustion gases from the burner ports enter the reaction chamber in a direction tangential to the circumference of the reaction chamber and normal to the longitudinal axis of the furnace. The velocity of the combustion gases is sufficient to form a swirling layer of combustion gases which blankets the wall of the reaction chamber throughout the entire length of the reaction chamber.

The reactant hydrocarbon enters the reaction chamber through an inlet which is superimposed essentially upon the longitudinal axis of the furnace. The reactant fills the volume inside of the swirling cylinder of combustion gases. Some of the reactant tends to diffuse into the combustion gases and some of the combustion gases tend to diffuse into the carbon black-forming stream. There is also some combustion, and other types of chemical reaction, at the interface. The main body of the carbon black-forming stream tends to pass through the furnace as a core centered around the longitudinal axis of the furnace and out of the furnace through the axial outlet.

Heat is transferred to the carbon black-forming stream by radiation from the walls of the reaction chamber and from the layer of combustion gases, and by the combustion and mingling at the interface of the two streams. The carbon black-forming stream absorbs this heat, and is largely decomposed into carbon black. The carbon black is concentrated in the carbon black-forming stream 35 and in the layer 34 of mingled gases at the interface. All of the core of the carbon black-forming stream 35, and whatever percentage of the mingled stream 34 that is desired, are taken from the furnace through the axial outlet. The greater percentage of the combustion gases, and the remainder of the mingled layer 34, are taken from the furnace through the tangential outlets 18.

The rate of injection of the reactant hydrocarbon to be decomposed will be in accord with the principles and practices of the art. The rate will vary with the temperature and amount of combustion gases, the amount of excess oxygen, and the quality of carbon black desired.

In order to more clearly illustrate our invention, the following examples are given:

EXAMPLE I

The furnace was constructed as shown in FIGS. 1 and 5. The cylindrical reaction chamber 12 was 10½ inches in diameter and 51 inches long. A single axial inlet 20 was 1 inch in diameter and terminated at the inlet end wall. Three tangential inlets 16, 1 inch in diameter, were installed as shown in FIG. 1, with two of the ports adjacent to the inlet end wall and spaced 180° apart. The third was 16 inches downstream of the first two ports. The axial outlet 25 of FIG. 5 consisted of a silicon carbide tube 4 inches I.D. and 5½ inches O.D., extending into the furnace 13½ inches upstream from the outlet end wall. A single tangential outlet 18, 3 inches I.D. was used. The reactant natural gas introduced axially was externally preheated to 1510° F. in a tubular preheater. The tangential air and fuel gas were premixed prior to entering the burner ports. The natural gas used for these tests had a heating value of 1210 B.t.u. per cu. ft. and contained about 40 pounds of carbon per one thousand cubic feet. Approximately 58% of the total gases leaving the furnace were removed axially. The carbon black produced in the furnace was compared with several commercial carbon blacks by evaluation in the rubber compound shown in Table 1. All vulcanizations were made at 307° F. for variable lengths of time.

*Table 1*

| | Parts by weight |
|---|---|
| Synthetic rubber, SRB–1500 | 100 |
| Carbon black | 50 |
| Zinc oxide | 4 |
| Stearic acid | 2 |
| Thermoflex-A | 1 |
| Paraflux-2016 | 3 |
| Cirosol-2XH | 3 |
| Sulfur | 2 |
| Santocure | 1 |
| | 166 |

The conditions of the tests and the properties of rubber compounds containing the carbon black are given in Table 2.

*Table 2*

| Run No. | Tangential air, SCFH | Tangential fuel, SCFH | Axial reactant gas, SCFH | Yield #/MCF total gas | Tint percent | Tensile, p.s.i. 50' cure | 300% modulus, p.s.i. 50' cure | Abrasion index, percent 50' cure |
|---|---|---|---|---|---|---|---|---|
| H9–F1 | 7,800 | 615 | 671 | 9.2 | 143 | 3,575 | 1,235 | 135 |
| H9–F2 | 6,000 | 472 | 500 | 12.6 | 119 | 3,260 | 1,075 | 113 |
| Commercial semi reinforcing furnace (SRF) black | | | | | 100 | 2,850 | 1,135 | 100 |
| Commercial fine furnace (FF) black | | | | | 152 | 3,575 | 1,040 | 142 |

Analyses of the gas streams from the furnace are given in Table 3.

*Table 3*

GAS ANALYSES OF AXIAL AND TANGENTIAL OUTLET STREAMS

| Run No. | Dry basis, mol percent | | | | | | | |
|---|---|---|---|---|---|---|---|---|
| | $CO_2$ | CO | $C_2H_2$ | Ill. | $O_2$ | $H_2$ | $CH_4$ | $N_2$ |
| H9–F1 axial | 3.3 | 10.2 | 0.7 | 0.8 | 0.0 | 21.4 | 5.0 | 58.6 |
| H9–F1 tangential | 9.6 | 4.1 | 0.0 | 0.0 | 0.2 | 3.3 | 0.0 | 82.8 |
| H9–F2 axial | 3.3 | 10.1 | 0.4 | 0.4 | 0.1 | 20.9 | 5.4 | 59.4 |
| H9–F2 tangential | 10.0 | 2.6 | 0.1 | 0.1 | 0.2 | 2.1 | 0.0 | 84.9 |
| M2–F1 axial | 2.8 | 10.3 | 0.6 | 0.9 | 0.0 | 24.2 | 1.6 | 59.6 |
| M2–F1 tangential | 11.5 | 0.0 | 0.0 | 0.0 | 1.0 | 0.0 | 0.0 | 87.5 |
| M2–F2 axial | 3.3 | 8.8 | 0.6 | 0.8 | 0.0 | 23.1 | 2.2 | 61.2 |
| M2–F2 tangential | 10.1 | 0.0 | 0.0 | 0.0 | 3.4 | 0.0 | 0.0 | 86.5 |
| O3–F3 axial | 3.6 | 11.4 | 0.0 | 0.5 | 0.0 | 17.7 | 0.6 | 66.2 |
| O3–F3 tangential.¹ | | | | | | | | |
| O4–F1 axial | 6.5 | 10.3 | 0.1 | 0.2 | 0.0 | 8.3 | 0.1 | 74.5 |
| O4–F1 tangential | 12.1 | 2.9 | 0.0 | 0.0 | 0.1 | 1.9 | 0.0 | 82.9 |

¹ Sample lost.

In all runs except O3–F3, only the axial stream was filtered.

EXAMPLE II

The furnace was the same as in Example I, except that a fourth tangential inlet 16 was installed 16 inches downstream of the third. Four tangential outlet ports 18, 3 inches in diameter, spaced each 90° of circumference were provided. The axial outlet was 4½ inches I.D. and 6 inches O.D., extending into the furnace 9 inches from the outlet end wall. Castable alumina was used to construct the axial outlet tube. Approximately 62% of the total gases leaving the furnace were removed through the axial outlet. The conditions of the test and the properties of rubber compounds containing the carbon black are given in Table 4. The rubber compounds have the same composition as given in Table 1. Gas compositions are given in Table 3.

*Table 4*

| Run No. | Tangential air, SCFH | Tangential fuel, SCFH | Axial reactant gas, SCFH | Yield #/MCF total gas | Tint percent | Tensile, p.s.i. 50' cure | 300% modulus, p.s.i. 50' cure | Abrasion index, percent 50' cure |
|---|---|---|---|---|---|---|---|---|
| M2–F1 | 4,550 | 222 | 516 | 15.0 | 103 | 3,025 | 1,020 | 108 |
| M2–F2 | 4,620 | 130 | 715 | 13.7 | 109 | 2,890 | 1,050 | 106 |
| Commercial SRF | | | | | 100 | 2,760 | 1,110 | 100 |
| Commercial high modulus furnace (HMF) black | | | | | 125 | 2,950 | 1,300 | 133 |
| Commercial FF | | | | | 153 | 3,400 | 1,090 | 144 |

EXAMPLE III

The furnace was identical to that used in Example II. In this series of runs oil feedstocks were added to the furnace through the axial inlet. In run O3–F3, oil "A" was metered as liquid into a tubular vaporizer, mixed with reactant natural gas, and the mixture preheated to 850° F. before entering the furnace through the axial inlet. Oil "A" had a distillation range of 290° F. to 840° F., gravity=14.1 degrees API, Bureau of Mines Correlation Index=81 and contained 8.1 pounds of carbon per gallon. In run O4–F1, "B" oil was sprayed as a cold liquid through a 0.028" diameter conical spray nozzle which extended into the axial inlet, 3 inches upstream of the inlet wall of the furnace. Oil "B" had a distillation range of 360° F. to 720° F., gravity=17.2 degrees API, Bureau of Mines Correlation Index=95 and contained 7.9 pounds of carbon per gallon. Approximately 63% of the total gases leaving the furnace were removed axially. The condiiton of the test and the properties of rubber compounds containing the carbon black are given in Table 5. The rubber compounds have the same composition as given in Table 1. Gas compositions are given in Table 3.

*Table 5*

| Run No. | Tangential air, SCFH | Tangential fuel gas, SCFH | Axial reactant gas, SCFH | Oil rate, GPH | Yield #/gal. | Yield Percent of total carbon | Tensile, p.s.i. 50' cure | 300 % modulus, p.s.i. 50' cure | Abrasion index, percent 75' cure |
|---|---|---|---|---|---|---|---|---|---|
| O3–F3 | 7,840 | 485 | 138 | 7.42 | 5.4 | 51 | 3,125 | 1,125 | 95 |
| O4–F1 | 8,720 | 472 | 0 | 5.67 | 2.8 | 27 | 3,290 | 1,300 | 180 |
| Commercial high abrasion furnace (HAF) black | | | | | | | 4,070 | 2,120 | 312 |
| Commercial fast extruding furnace (FEF) black | | | | | | | 3,200 | 1,910 | 159 |
| Commercial general purpose furnace (GPF) black | | | | | | | 2,745 | 1,330 | 100 |

Temperatures of the heat-donating stream are generally 2700 to 3200° F. at the inlet end of the furnace, and 2400 to 3000° F. at the exit point. The temperature of the axial outlet stream is generally 2100 to 2700° F., depending upon the percentage decomposition of the reactant stream and upon the amount of combustion gases which are removed through the axial outlet together with the heat-receiving stream. Temperatures within the furnace wall also vary depending upon the type of hydrocarbon reactant, the degree of preheat to the reactant, and the degree of preheat given to the oxidizing gas which is used for combustion of the tangential stream. Preheating of the reactant and of the oxidizing gas is desirable but may be omitted without departing from the invention or its broadest aspects as such preheating is not essential for successful operation of the process.

While chambers varying in diameter from ten and one-half inches to twenty-two inches have been successfully used, we do not wish to limit our apparatus to these sizes since other sizes both smaller and larger may be used within the scope of the invention. The optimum number of tangential burners, the optimum size of the tangential burner ports and the optimum size of the reactant inlet port are to be determined for each furnace. Velocities of the incoming gaseous mixture through the tangential burner ports may vary over wide limits, but should be rather high in case the gaseous fuel and oxidizing gas are mixed in explosive proportions. Velocity of the tangential gas flow has been varied from as low as two feet per second to 1100 feet per second, calculated at the temperature of the gases as they enter the reactor. The higher velocities are flue gases at approximately 3000° F. Velocity of the hydrocarbon reactant as it enters the furnace chamber will vary with the composiiton and type of reactant, but we have found satisfactory operation at velocities of 5 to 300 feet per second for natural gas having a specific gravity of approximately 0.72. Wider operating limits may be employed within the scope of the invention.

Furnaces have been investigated having ratios of length/diameter of the internal reaction chamber of 3.5/1 to 5.1/1. The length of the reaction chamber is influenced by the degree of intermixing of the two streams which is permissible, the velocity of the tangential stream, and the desired degree of decomposition of the reactant stream. Furnaces with greater length/diameter ratios may, however, be employed.

The diameter of the outlet tube in the center of the outlet wall has some influence upon the diameter of the gas stream 35 of FIG. 10. We have used tubes of 5" I.D. to 14" I.D. in a 22" I.D. reactor quite satisfactorily.

Materials of construction for the carbon black producing furnace may be selected from among those items commercially available and best suited to the operating conditions as herein disclosed.

It will be understood that the embodiments of our process and apparatus as herein disclosed are given for illustrative purposes and that many variations and modifications in operation and construction may be made by those skilled in the art without departing from the spirit or scope of our invention.

We claim:

1. A process for producing carbon black in a reaction chamber having a peripheral wall of generally circular cross section and end walls, which process comprises continuously introducing a reactant hydrocarbon stream of fluid at approximately the center of one of the end walls, passing said reactant stream axially from the inlet to the outlet end of the reaction chamber without contacting the peripheral wall, heating the reactant stream while passing through the reaction zone of said chamber to a temperature sufficient to decompose the hydrocarbon and form carbon black by heat interchange with a gaseous heat donating stream of fluid, and thereafter removing a portion of the reactant stream containing the major portion of the carbon black from the reaction chamber through an opening in the center of the outlet end wall, said heating being accomplished by forcing the heat donating stream of fluid tangentially through the peripheral wall into the reaction chamber near the inlet end thereof, and maintaining it at a sufficiently high velocity so that the heat donating stream forms a vortex which blankets the cylindrical wall of the reaction chamber throughout substantially the entire length thereof while leaving a central portion substantially open for passage of the reactant stream axially therethrough from end to end of the chamber, maintaining the reactant and the heat donating streams in direct heat exchange relation throughout their passage through the reaction zone of the chamber, removing a portion of the heat donating stream of fluid from the periphery of the chamber through at least one peripheral port adjacent the end of the reaction chamber opposite from its inlet, cooling the portion of the carbon containing stream removed from the central outlet in the reaction chamber, and separately collecting the carbon black therefrom.

2. A process as set forth in claim 1, wherein an intermediate layer of mixed reactant and heat donating fluids is maintained between the peripheral blanket of heat donating fluid and the central stream of heat reactant fluid.

3. A process for producing carbon black in a reaction chamber having a peripheral wall of generally circular cross section and end walls, which process comprises continuously introducing a reactant hydrocarbon stream of fluid at approximately the center of one of the end walls, passing said reactant stream axially from the inlet to the outlet end of the reaction chamber without contacting the peripheral wall, heating the reactant stream while passing through the reaction zone of said chamber to a temperature sufficient to decompose the hydrocarbon and form carbon black by heat interchange with a gaseous heat donating stream of fluid, and thereafter removing a portion of the reactant stream containing the major portion of the carbon black from the reaction chamber through an opening in the center of the outlet end wall, said heating being accomplished by forcing the heat donating stream of fluid tangentially through the peripheral wall into the reaction chamber near the inlet end thereof, and maintaining it at a sufficiently high velocity so that the heat donating stream forms a vortex which blankets the cylindrical wall of the reaction chamber throughout substantially the entire length thereof while leaving a central portion substantially open for passage of the reactant stream axially therethrough from end to end of the chamber, maintaining the reactant and the heat donating streams in direct heat exchange relation throughout their passage through the reaction zone of the chamber, removing a portion of the heat donating stream of fluid from the periphery of the chamber through at least one peripheral port adjacent the end of the reaction chamber opposite from its inlet, cooling the portion of the carbon containing stream removed from the central outlet in the reaction chamber, and separately collecting the carbon black therefrom, the heat donating stream of fluid having a temperature substantially within the range of 2700–3200° F. adjacent its point of entry into the reaction zone of the chamber, and having a temperature substantially within the range of 2400–3000° F. adjacent its point of removal from the reaction zone of the chamber.

4. A process as set forth in claim 1 wherein the heat donating fluid is removed at a temperature of about 2400–3000° F. and the temperature at the axial outlet is about 2100–2700° F.

5. A process as set forth in claim 1, wherein the heat donating and reactant fluids pass concurrently through the furnace in the same general direction from the inlet to the outlet ends of the reaction chamber.

6. A process as set forth in claim 1, wherein additional heat donating fluid is supplied tangentially to the reaction chamber downstream from the inlet for the reactant stream but substantially upstream from the outlets for the reacting and heat donating fluids.

7. A process as set forth in claim 1, wherein an oxygen containing gas is supplied to the reaction chamber tangentially thereto substantially upstream from the outlets for the reacting and heat donating fluids.

8. A process as set forth in claim 1 wherein the velocity of the incoming tangential heat donating gaseous stream is substantially greater than that of the incoming axial reactant stream of hydrocarbon fluid.

9. A furnace for heat reacting hydrocarbon fluids to effect thermal decomposition thereof, said furnace comprising a peripheral side wall portion of circular cross section having end walls defining with the side wall a reaction chamber, means for passing a gaseous heat donating fluid from end to end of the reaction chamber in a swirling movement wherein the heat donating fluid forms a vortex blanketing substantially the entire peripheral surface of the reaction chamber, and for peripherally withdrawing spent heat donating fluid from the end of the chamber opposite its entry, said means comprising at least one inlet port extending through the circular wall tangentially into the reaction chamber, and at least one oppositely disposed peripheral outlet port so arranged as to receive the swirling heat donating fluid without change in direction of the heat donating fluid, tangentially located in the peripheral wall adjacent the opposite end of the reaction chamber from the inlet port, and means for passing a hydrocarbon containing stream of reaction fluid axially through the center of the furnace, including an axial inlet port for the reactant fluid located at the approximate center of one end wall and at the same end as the tangential inlet, and an outlet port located in substantial axial alignment therewith in the opposite end wall, conduits connected to said inlet and outlet ports and means in the outlet conduits for varying the flow of fluids therethrough, said axial inlet port being connected to an external source of supply of hydrocarbon fluid and said axial outlet conduit being connected to external means for separating decomposition products from the outgoing stream, the entire interior of the furnace being unobstructed from end to end to permit direct contact between the heat donating stream of the fluid and the reaction fluid to effect interchange therebetween, and to thermally decompose the hydrocarbon constituents of the reactant stream of fluid.

10. A furnace as set forth in claim 9 wherein the axial outlet extends into the reaction chamber to a distance slightly upstream of the tangential outlet.

11. A furnace as set forth in claim 9 having one or more peripheral inlets for the heat donating fluid located downstream from the inlet opening for the reactant fluid but substantially upstream from the outlets for the reactant and heat donating fluids.

12. A furnace as set forth in claim 9, wherein the peripheral side wall portion is of generally cylindrical form.

13. A furnace as defined in claim 12 wherein the ratio of the length to the internal diameter of the reaction chamber is at least 3½:1.

14. A furnace for heat reacting hydrocarbon fluids to effect thermal decomposition thereof, said furnace comprising a peripheral side wall portion of circular cross section having end walls defining with the side wall a reaction chamber, means for passing a gaseous heat donating fluid from end to end of the reaction chamber in a swirling movement wherein the heat donating fluid forms a vortex blanketing substantially the entire peripheral surface of the reaction chamber, and for peripherally withdrawing spent heat donating fluid from the end of the chamber opposite its entry, said means comprising at least one inlet port extending through the circular wall tangentially into the reaction chamber, and at least one oppositely disposed peripheral outlet port so arranged as to receive the swirling heat donating fluid without change in direction of the heat donating fluid, tangentially located in the peripheral wall adjacent the opposite end of the reaction chamber from the inlet port, and means for passing a hydrocarbon containing stream of reaction fluid axially through the center of the furnace, including an axial inlet port for the reactant fluid located at the approximate center of one end wall and at the same end as the tangential inlet, and an outlet port located in substantial axial alignment therewith in the opposite end wall, conduits connected to said inlet and outlet ports and means in the outlet conduits for varying the flow of fluids therethrough, said axial inlet conduit being connected to an external source of supply of hydrocarbon fluid and said axial outlet conduit being connected to external means for separating decomposition products from the outgoing stream, the entire interior of the furnace being open from end to end to permit direct contact between the heat donating stream of the fluid and the reaction fluid to effect interchange therebetween, and to thermally decompose the hydrocarbon constituents of the reaction stream of fluid, the peripheral side wall portion of said furnace being of generally tapered form.

References Cited in the file of this patent

UNITED STATES PATENTS

| | | |
|---|---|---|
| Re. 22,886 | Ayers | June 3, 1947 |
| 2,546,042 | Oberfell et al. | Mar. 20, 1951 |
| 2,805,131 | McIntire | Sept. 3, 1957 |
| 2,942,043 | Prummert | June 21, 1960 |